United States Patent [19]
Ryan

[11] 3,790,035
[45] Feb. 5, 1974

[54] MANURE SPREADER WITH BED CLOSING GATES

[75] Inventor: Kelly P. Ryan, Blair, Nebr.

[73] Assignee: Blair Manufacturing Co., Inc., Blair, Nebr.

[22] Filed: Feb. 2, 1972

[21] Appl. No.: 222,864

[52] U.S. Cl. .............................. 222/178, 222/517
[51] Int. Cl. ........................................... A01c 19/00
[58] Field of Search ... 222/176, 177, 178, 494, 415, 222/313, 491, 496, 517; 239/676; 137/527, 527.6

[56] References Cited
UNITED STATES PATENTS

| 3,253,834 | 5/1966 | Bing et al. | 239/676 |
| 280,095 | 3/1888 | Davidson | 222/313 |
| 3,229,983 | 1/1966 | Brammer | 222/313 X |

Primary Examiner—Stanley H. Tollberg
Attorney, Agent, or Firm—Hofgren, Wegner, Allen, Stellman & McCord

[57] ABSTRACT

A manure spreader especially adapted for use in spreading relatively fluid manures. The exemplary embodiment comprises a box-like bed having an open end mounted on wheels and including a conveyor within the bed for conveying manure towards the open end thereof. In addition, a rotary spreading element is provided for spreading manure fed to the same by the conveyor. A pivotally mounted gate is biased towards a position to close the bed with the biasing being sufficiently weak that upon operation of the conveyor or spreader, the pressure of manure impinging against the gate will cause the same to automatically open to allow manure to be spread. The gate insures that relatively fluid manures cannot escape from the bed during movement of the spreader to a location whereat a spreading operation is to take place and prior to initiation of the spreading operation.

2 Claims, 2 Drawing Figures

PATENTED FEB 5 1974　　　　　　　　　　　　　　　　3,790,035

3,790,035

MANURE SPREADER WITH BED CLOSING GATES

BACKGROUND OF THE INVENTION

This invention relates to manure spreaders.

Manure spreaders have long been used by farmers to distribute waste of livestock on fields to be cultivated for the fertilizer value of the waste. Typically, a manure spreader includes a box-like bed having an open end with a conveyor mounted in the bed for feeding manure towards the open end. Just above the end of the conveyor near the open end of the bed there is located a rotatable element having a plurality of paddles for engaging the manure as it is delivered to the open end by the conveyor to throw the same evenly out of the open end to spread the same on the field. Generally, the spreading device and the conveyor are selectively operable and are inoperative when the manure spreader is being moved to a location where a spreading operation is to take place.

For most types of manure, the foregoing construction is satisfactory inasmuch as there is little tendency for the manure to exit the bed during movement of the vehicle to the desired point of use so that little of the manure is lost at undesired locations. However, some types of manure, as for example, hog manure, are more fluid than others and if a substantial distance from the point of loading of the spreader to the intended point of operation is present, a significant amount of such relatively fluid manures may be lost in transit. And the rough terrain over which such vehicles customarily must travel aggravates the problem.

SUMMARY OF THE INVENTION

It is a principal object of the invention to provide a new and improved manure spreader. More specifically, it is the object of the invention to provide a new and improved manure spreader that may be used in spreading relatively fluid manures without loss of a substantial portion of the load in transit and which does not require additional manual manipulation of parts or mechanisms to accomplish the function.

The exemplary embodiment of the invention achieves the foregoing objects by means of a construction including a box-like bed having an open top and an open end and adapted to receive manure. Within the bed there is located a conveyor for conveying manure received toward the open end and adjacent the open end, a spreader device is located for throwing manure received by the same from the conveyor out of the open end to spread the same as desired.

A gate is pivotally mounted adjacent the open end for movement between a position wherein the open end is closed and a position wherein the open end is opened and is normally biased by a relatively weak spring toward the closed position. The spring exerts sufficient force against the gate so as to maintain the same in the closed position when a spreading operation is not to take place. However, when operation of one or the other or both of the conveyor or the spreader device takes place, the pressure of the manure against the gate is sufficient to overcome the biasing of the spring and move the gate to its open position whereupon the manure may be spread. Preferably, the gate is of sufficient weight so that once moved to its open position, the weight of the gate will overcome the bias of the spring to maintain the gate in the open position.

As a result of the construction, the open end of the bed is maintained in a closed position while the spreader is in transit to a location where spreading operation is to take place and immediately upon initiation of operation of the spreader, the gate will automatically respond thereto to open without manual manipulation and remain open for the duration of the spreading operation at which time may be manually closed.

Other objects and advantages will become apparent from the following specification taken in conjunction with the accompanying drawings.

DESCRIPTION OF THE PREFERRED EMBODIMENT

Figure 1:
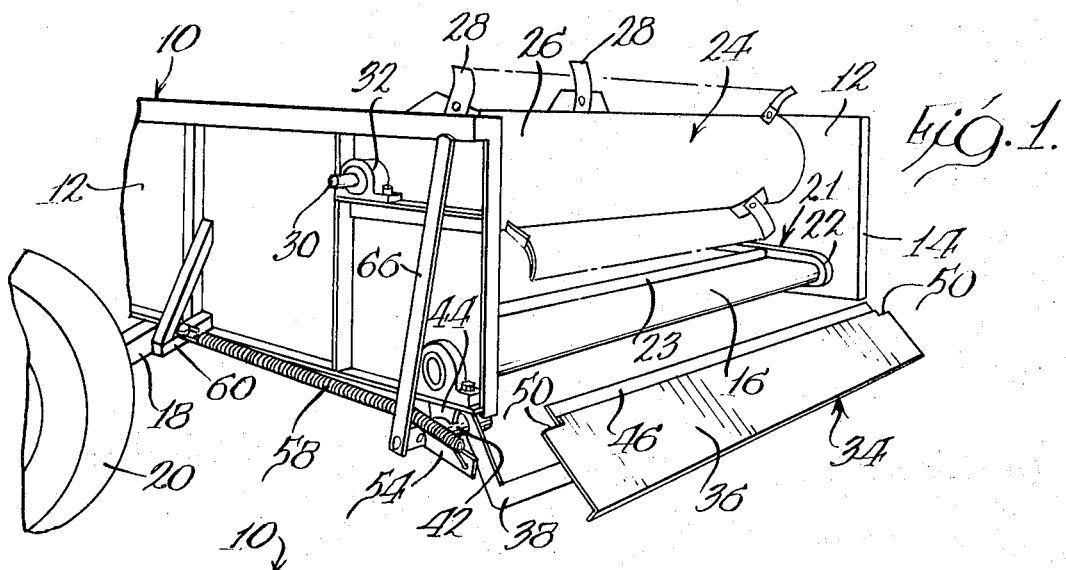
FIG. 1 is a fragmentary perspective view of a manure spreader made according to the invention.

An exemplary embodiment of a manure spreader is illustrated in FIG. 1 and is seen to comprise a box-like bed, generally designated 10, having upstanding side walls 12, an open top, an open end 14 and a bottom 16. The bottom 16 is supported by axles 18 (only one of which is shown) which, in turn, mount wheels 20 (only one of which is shown) whereby the same may be moved to the desired point of use.

Within the bed 10, and just above the bottom 16 thereof, there is located a horizontal conveyor 21 comprised of spaced drive chains 22 mounting angle irons 23 and operative when energized in a conventional fashion to convey manure within the bed 10 from left to right as viewed in FIG. 1 toward the open end 14.

Just above the conveyor 21 and adjacent the open end 14 there is a conventional spreading device, generally designated 24, and comprised of a rotatable drum 26 mounting a plurality of paddles 28. The drum 26 is mounted on a shaft 30 journalled in pillow block bearings 32 mounted on the side walls 12 and may be driven in a counterclockwise direction as indicated in FIG. 1 by any conventional means as is well-known in the art to engage manure conveyed toward the open end 14 by the conveyor 21 and throw the same out of the end 14 to spread the same along the ground on which the vehicle is traveling.

Also provided is a pressure responsive gate means, generally designated 34 for closing the open end 14 so that relatively fluid manures cannot exit the end 14 unintentionally as, for example, when the bed 10 is being moved to a point of intended use. With reference to both FIGS. 1 and 2, the gate means 34 is comprised of a gate member 36 of sufficient length to effectively close the open end 14. A pair of elbow-shaped links 38 each have one end secured to the gate 36 and their other end fixedly secured to a pivotal shaft 40. The shaft is received in spaced sleeves 42 (only one of which is shown) secured to the underside of the bed 10 by blocks 44. As a result, the gate 36 is movable between open and closed positions as illustrated in FIG. 2.

Figure 2:
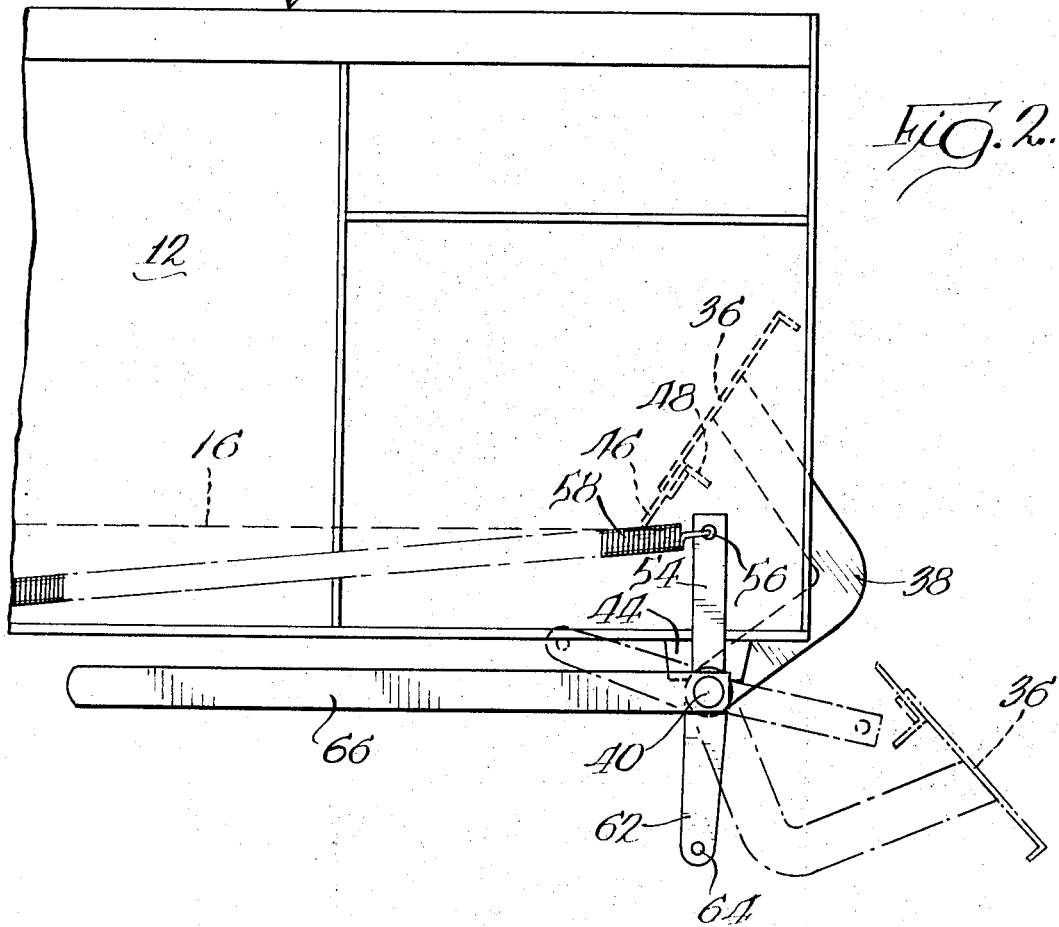
FIG. 2 is a fragmentary side elevation of the manure spreader.

More specifically, when the gate 36 is in the solid line position illustrated in FIG. 2, a resilient lower edge 46 formed of rubber or the like will abut the bed bottom 16 to preclude appreciable leakage of manure out of the open end 14. The resilient lower edge 46 may be secured in place by an angle iron 48 or the like and the lower corners of the gate 36 are notched as at 50 to accommodate the drive chains 22 for the conveyor 21.

Returning to the shaft 40, a biasing arm 54 is secured to the same and has an aperture 56 near its upper end for receiving one end of a spring 58. The other end of the spring 58 is secured by any suitable means to a member 60 projecting outwardly from one side of the bed 10. As a result, the gate 36 will normally be biased to its solid line or closed position as illustrated in FIG. 2.

In addition, the shaft 40 fixedly mounts a stop arm 62 having an inwardly projecting stop pin 64 adapted to engage the underside of the bed 10 and limit clockwise movement of the gate 36 about the pivot point defined by the shaft 40 so that the gate 36 cannot move beyond the dotted line or open position illustrated in FIG. 2. Finally, a manual operator 66 is fixedly secured to the shaft 40 for manual manipulation of the gate 36.

As mentioned previously, it is an object of the invention that the gate 36 respond to pressure applied thereto by moving manure forced against the same by operation of either the conveyor 21 or the spreading device 24 or both to move from its closed position to its open position. In addition, it is desired that the gate 36 remain in the open position once the spreading operation has been initiated even though subsequently ceased. That is, opening of the gate is responsive to initiation of a spreading operation while closing of the same, in the exemplary embodiment, must be accomplished manually through appropriate manipulation of the manual operator 66.

To the foregoing ends, the spring 58 is chosen to be relatively weak and exert a force against the gate 36 just sufficient to maintain the same in the closed position whenever pressure is not being applied thereto by moving manure. In addition, it is desirable that the spring 58 be sufficiently weak such that the weight of the gate will overcome the closing bias applied to the same when the gate has been moved to its open position.

In operation, with the gate 36 closed, the bed 10 may be loaded with manure and the vehicle then towed to a location whereat the manure is to be spread. During such movement, the conveyor 21 and the spreading device 24 are inoperative and the gate 36 will remain in its closed position to preclude appreciable leakage of manure through the open end 14 of the bed even though the bed may be traveling over extremely rough terrain, as, for example, furrows in a cultivated field.

When the desired point of use has been reached, the conveyor 21 and the spreading device 24 may be actuated in a conventional manner with the result that manure will be moved against the gate 36. The resulting pressure applied to the same will overcome the bias of the spring with the result that the gate 36 will move from its closed position to its open position and the spreading operation will take place in the conventional manner.

Thereafter, when the spreading operation has been completed, the gate 36 will remain open until such time as it is closed by counterclockwise movement of the manual operator 66, at which time it will then remain closed until the operation is repeated.

I claim:

1. A manure spreader comprising a box-shaped bed having an open top and an open end and adapted to receive manure; wheel means mounted on said bed whereby said bed may be transported to a desired location; a conveyor within said bed extending substantially along the length thereof and operative to convey manure within said bed towards said open end; manure spreading means mounted adjacent said open end for spreading manure conveyed thereto by said conveyor; a pivotally mounted gate for normally closing said open end and responsive to pressure applied to the same by moving manure for moving to and remaining in a fully open position whereby manure may be retained in said bed during movement of the same to a location where manure is to be spread and a manure spreading operation may be initiated by operating at least one of said conveyor and said spreading means without manual manipulation of said gate; means whereby said gate may be closed following a manure spreading operation; said gate being pivotally mounted along one side thereof to said bed, and further including a spring connected to said gate for biasing the same towards the position wherein said open end is closed by the gate; said spring having sufficient strength to maintain said gate in said closed position when a manure spreading operation is not taking place but insufficient strength to maintain said gate in said closed position during a manure spreading operation; the weight of said gate further being such as to cause the same to remain open against the bias of said spring once the gate has been moved to an open position; said gate being pivotally mounted by means of a shaft journalled to said bed, said gate being fixed to said shaft; an arm extending from said shaft and having said spring secured thereto to bias said shaft in a direction to close said gate; a handle secured to said shaft for rotating the same to manually control said gate; and stop means secured to said shaft for engaging said bed to limit movement of said gate in one direction of movement thereof.

2. The manure spreader of claim 1 further including a resilient sealing element depending from the underside of said gate for sealingly engaging said bed when said gate is in the closed position.

* * * * *